Nov. 29, 1960 K. R. LUNG 2,962,304
PIPE COUPLING FOR PUMPS HAVING RESILIENT
MEANS TO INSULATE AND DAMPEN VIBRATIONS
Filed July 18, 1957
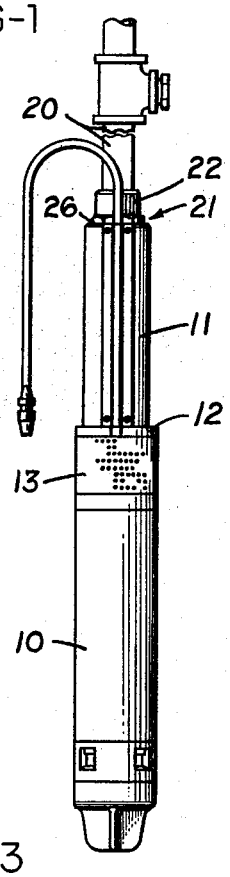
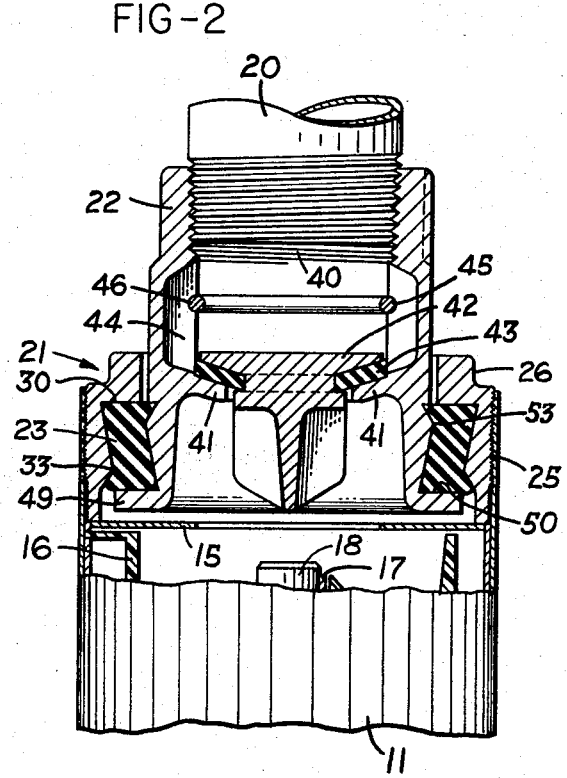
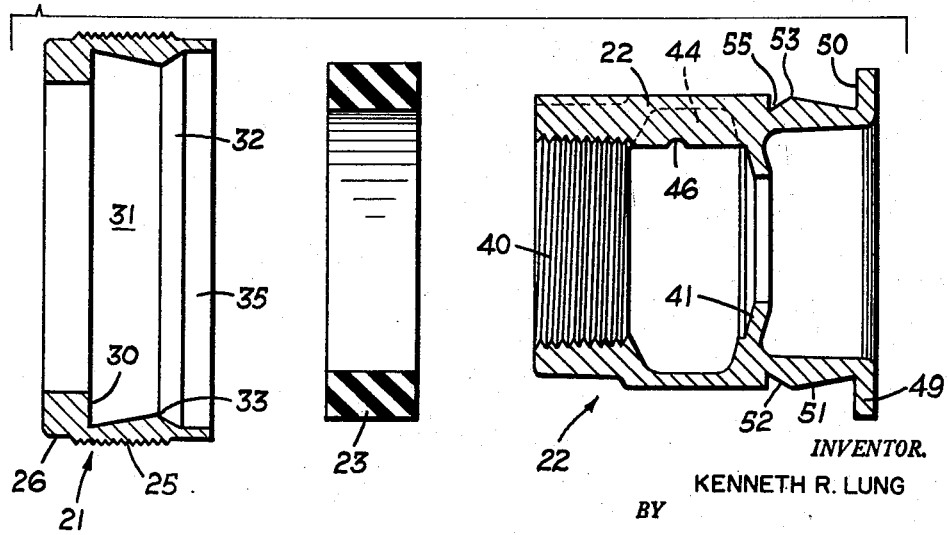
INVENTOR.
KENNETH R. LUNG
BY
Marechal, Biebel, French & Bugg
ATTORNEYS United States Patent Office 2,962,304
Patented Nov. 29, 1960

2,962,304

PIPE COUPLING FOR PUMPS HAVING RESILIENT MEANS TO INSULATE AND DAMPEN VIBRATIONS

Kenneth R. Lung, Dayton, Ohio, assignor to The Tait Manufacturing Company, Dayton, Ohio, a corporation of Ohio Filed July 18, 1957, Ser. No. 672,717

4 Claims. (Cl. 285—48)

This invention relates to pumps.

The invention has particular relation to submersible pumps of the type including a motor as a part of the entire assembly which is submerged in a well by suspension from the pipe through which the discharge of the pump reaches the surface. In the normal course of pumping operation with such pumps, considerable vibration may develop in the pump assembly, and if this assembly is attached to the discharge pipe by a metal to metal or otherwise rigid connection, such vibration is likely to be transmitted to and by the pipe. Furthermore, if the length of the pipe should be in correct relation to the frequency of the vibrations, a resonant condition may develop which will be objectionably noisy.

It is a primary object of the present invention to provide a connection assembly for attaching a submersible pump to its discharge pipe which is simple and economical to construct and install, which will establish a firm and pressure-tight connection between the pump and the discharge pipe, and which will also effectively insulate against transmission of vibrations between the pump assembly and its discharge pipe.

Another object of the invention is to provide a connection assembly as outlined above in which the component parts are of individually simple construction and may be assembled in their own final relative positions apart from both the pump assembly and its discharge pipe.

An additional object of the invention is to provide a connection assembly as outlined above wherein the component parts include an outer housing and an inner body which are assembled in telescoping relation in combination with an intermediate member of rubber material and which interlock with each other through the intermediate member in such manner both as to resist disassembly thereof and also that the forces normally exerted thereon in use are in the direction to hold these parts assembled.

It is also an object of the invention to provide a connection assembly as outlined above which is effective to insulate against transmission of electric current as well as vibrations between the pump assembly and its discharge pipe, and which will therefore prevent the possibility of shock to the user in the event of accidental shortcircuiting of the motor to the pump shell.

Additional objects and advantages of the invention will be apparent from the following description, the accompanying drawing and the appended claims.

In the drawing—

Fig. 1 is a perspective view illustrating a submersible pump assembly of the type to which the present invention relates;

Fig. 2 is an enlarged fragmentary view in axial section through the connection assembly by which the pump assembly of Fig. 1 is connected with its discharge pipe; and Fig. 3 is an exploded view in axial section of the component parts of the connection assembly of Fig. 1.

Referring to the drawing, which illustrates a preferred embodiment of the invention, the submersible pump assembly shown in Fig. 1 includes a motor casing 10, a pump shell 11, and an intake cap 12 which connects the parts 10 and 11 and is covered by a perforate screen 13. Such pumps are commonly of the multi-stage centrifugal type, and Fig. 2 shows the diffuser cover 15 and fragments of the diffuser 16 and impeller 17 of the uppermost pumping stage on the pump shaft 18 in casing 11, these parts being indicated as of the structure shown in my copending application Serial No. 633,412, filed January 10, 1957 and assigned to the same assignee as this application. The present invention is directed particularly to the connection assembly by which the pump shell 11 is attached to the lower end of the discharge pipe 20 through which the output of the pump reaches the surface.

This connection assembly comprises three main components, the discharge housing 21, the discharge body 22, and the discharge gland 23. The discharge housing 21 is an annular member having a cylindrical threaded outer surface portion 25 for attachment within the upper end of shell 11, and a hexagonal portion 26 on the upper end of housing 21 facilitates its threaded mounting in the shell 11. Within the housing 21 is an annular seat 30 located to face the pump assembly. The inner wall surface of the housing 21 includes a portion 31 which is tapered inwardly from the outer periphery of the seat 30, and a second portion 32 of the wall surface is tapered in the opposite direction from the surface 31 to provide a ridge 33 which radially overlies the seat 30. The angles of taper of the surfaces 31 and 32 are shown as approximately 10° and 30° respectively to the axis of the housing 21, and an additional cylindrical wall surface 35 extends from the end of the surface 32 to the inner end of housing 21.

The discharge body 22 is an annular member which is proportioned for partial telescoping assembly with the housing 21, and it includes an internally threaded portion 40 for receiving the threaded lower end of the pipe 20. The body 22 is also constructed with an internal seat 41 to receive the usual poppet valve 42 and its associated rubber seal 43, the valve 42 being guided for generally axial movement in the body 22 by rib portions 44 and being retained within the body 22 by a snap ring 45 located in notches 46 in ribs 44.

At its lower end, the body 22 includes an outwardly extending flange 49 which provides an annular shoulder 50 on its upper surface, and the shoulder 50 has an outer diameter which is relatively slightly less than the inner diameter of the ridge 33 in housing 21 so that when these two parts are assembled as shown, the shoulder 50 and seat 30 face each other in radially overlapping relation. The outer wall surface of the body 22 includes a first portion 51 which tapers outwardly from the inner periphery of shoulder 50 and a second portion 52 which tapers in the opposite direction from the upper end of the portion 51 to form therewith a ridge 53 similar to the ridge 33 and similarly radially overlying the shoulder 50. The angles of taper of the surfaces 51 and 52 are shown as the same as for surfaces 31 and 32 respectively, and the surface 52 thus provides a circumferential notch 55 in the body 22.

The discharge gland 23 is formed of mechanical rubber, which term is to be understood as covering natural and synthetic rubber as well as other elastomeric resins having comparable properties of resilience and non-conductivity of electricity. The gland 23 in its unstressed normal condition shown in Fig. 3 may be a ring of simple cylindrical section which for convenience of assembly should have an outer diameter sufficiently less than the inner diameter of the ridge 33 in housing 21 for slip-fit reception therein, satisfactory results having been obtained with a difference of approximately 1/32 inch between these diameters when the connection assembly is of the size for attachment to a pipe 20 of 1.5 inches diameter. The normal axial length of the gland 23 should equal or slightly exceed the total axial length of the surfaces 31—32 or 51—52, but the normal inner diameter of gland 23 should be slightly less than the inner diameter of the seat 50 and notch 55, for example 1/32 inch less, and will thus establish a somewhat greater difference between the normal radial thickness of gland 23 and the radial spacing of ridges 33 and 53, satisfactory results in the above example having been obtained with this difference equal to approximately 3/32 inch.

The parts 21—23 are assembled by axial movement towards each other from the relative positions shown in Fig. 3 under sufficient pressure, as in a press, to cause them to assume the relative positions shown in Fig. 2, and this operation is facilitated if gland 23 is coated with rubber cement to serve as a lubricant while wet, and subsequently as an adhesive. During assembly, the ridges 33 and 53 move axially past each other to the limit permitted by engagement of the seat 30 and shoulder 50 with the opposite ends of gland 23, and this in turn causes the gland to be distorted as shown in overlapping relation with both ridges.

When this connection assembly is completed and employed with the pump assembly in a well, it will be seen that the forces normally effective thereon are in the direction to maintain the parts in their assembled condition, since both the weight of the pump assembly and its discharge pressure will be effective in the direction to move the housing 21 downwardly with respect to the body 22. These forces are therefore supported and maintained by the gland 23, which at the same time provides effective insulation against transmission of vibrations between the housing 21 and body 22. With the gland 23 also of non-conductive material, even if the motor should burn out and become grounded to the pump shell 11, no current could flow to the pipe 20 because of the insulating effect of gland 23. The connection assembly of the invention therefore provides a safety factor in addition to its efficient suppression of transmission of vibrational noises to the discharge pipe and its advantages of practical simplicity and economy.

While the form of apparatus herein described constitute a preferred embodiment of the invention, it is to be understood that the invention is not limited to this precise form of apparatus, and that changes may be made therein without departing from the scope of the invention which is defined in the appended claims.

What is claimed is:

1. A discharge connection of the character described for attaching a pump assembly to a pipe and constructed for assembly of the component parts thereof by axial movement towards each other, comprising an annular discharge housing adapted to be connected to the pump assembly and having an internal annular seat positioned to face the pump assembly, an annular discharge body adapted to be connected to the pipe, said body being proportioned for partial telescoping engagement within said housing by movement toward said seat and including an annular shoulder arranged to face said seat and dimensioned for substantial radial overlapping with said seat, the inner wall surface of said housing being smoothly tapered inwardly thereof from the outer periphery of said seat, the outer wall surface of said body being smoothly tapered outwardly from the inner periphery of said shoulder, a separate ring of rubber material having smooth inner and outer surfaces proportioned to be received in axially-sliding telescoping engagement with both of said tapered surfaces, each of said tapered surfaces terminating in a circumferential ridge, each of said tapered surfaces being shorter axially than the length of said ring in the normal unstressed condition thereof but longer than one-half of said ring length to cause said ridges to move past each other during axial assembly of said ring and said body in said housing to positions wherein the axially opposite ends of said ring engage said seat and said shoulder, and the radial spacing of said ridges being less than the normal radial thickness of said ring to effect radial distortion of said ring into interlocking relation with said ridges securing said housing and body against axial separation while insulating against transmission of vibrations therebetween.

2. A discharge connection of the character described for attaching a pump assembly to a pipe and constructed for assembly of the component parts thereof by axial movement towards each other, comprising an annular discharge housing adapted to be connected to the pump assembly and having an internal annular seat positioned to face the pump assembly, an annular discharge body adapted to be connected to the pipe, said body being proportioned for partial telescoping engagement within said housing by movement toward said seat and including an annular shoulder arranged to face said seat and dimensioned for substantial radial overlapping with said seat, the inner wall surface of said housing being smoothly tapered inwardly thereof from the outer periphery of said seat, the outer wall surface of said body being smoothly tapered outwardly from the inner periphery of said shoulder, a separate ring of rubber material having smooth inner and outer surfaces, proportioned to be received in axially sliding telescoping engagement with both of said tapered surfaces, each of said wall surfaces having an oppositely tapered portion abutting the first named said tapered portion thereof to provide a circumferential ridge, each of said first named tapered surface portions being shorter axially than the length of said ring in the normal unstressed condition thereof but longer than one-half of said ring length to cause said ridges to move past each other during axial assembly of said ring and said body in said housing to positions wherein the axially opposite ends of said ring engage said seat and said shoulder, and the radial spacing of said ridges being less than the normal radial thickness of said ring to effect radial distortion of said ring into interlocking relation with said ridges securing said housing and body against axial separation while insulating against transmission of vibrations therebetween.

3. A connection of the character described for attachment to a pipe and constructed for assembly of the component parts thereof by axial movement towards each other, comprising an annular body adapted to be connected to the pipe and including an annular shoulder arranged to face in the direction of the pipe, an annular housing proportioned for partial telescoping engagement over said body by movement toward said shoulder and having an internal annular seat arranged to face said shoulder and dimensioned for substantial radial overlapping with said shoulder, the inner wall surface of said housing being smoothly tapered inwardly thereof from the outer periphery of said seat, the outer wall surface of said body being smoothly tapered outwardly from the inner periphery of said shoulder, a separate ring of rubber material having smooth inner and outer surfaces proportioned to be received in axially sliding telescoping engagement with both of said tapered surfaces, each of said tapered surfaces terminating in a circumferential ridge, each of said tapered surfaces being shorter axially than the length of said ring in the normal unstressed condition thereof but longer than one-half of said ring length to cause said ridges to move past each other during axial assembly of said ring and said body in said housing to positions wherein the axially opposite ends of said ring engage said seat and said shoulder, and the radial spacing of said ridges being less than the normal radial thickness of said ring to effect radial distortion of said ring into interlocking relation with said ridges securing said housing and body against axial separation while insulating against transmission of vibrations therebetween.

4. A connection of the character described for attachment to a pipe and constructed for assembly of the component parts thereof by axial movement towards each other, comprising an annular body adapted to be connected to the pipe and including an annular shoulder arranged to face in the direction of the pipe, an annular housing proportioned for partial telescoping engagement over said body by movement toward said shoulder and having an internal annular seat arranged to face said shoulder and dimensioned for substantial radial overlapping with said shoulder, the inner wall surface of said housing being smoothly tapered inwardly thereof from the outer periphery of said seat, the outer wall surface of said body being smoothly tapered outwardly from the inner periphery of said shoulder, a separate ring of rubber material having smooth inner and outer surfaces proportioned to be received in axially sliding telescoping engagement with both of said tapered surfaces, each of said wall surfaces having an oppositely tapered portion abutting the first named said tapered portion thereof to provide a circumferential ridge, each of said first named tapered surface portions being shorter axially than the length of said ring in the normal unstressed condition thereof but longer than one-half of said ring length to cause said ridges to move past each other during axial assembly of said ring and said body in said housing to positions wherein the axially opposite ends of said ring engage said seat and said shoulder, and the radial spacing of said ridges being less than the normal radial thickness of said ring to effect radial distortion of said ring into interlocking relation with said ridges securing said housing and body against axial separation while insulating against tranmission of vibrations therebetween.

References Cited in the file of this patent

UNITED STATES PATENTS

| | | |
|---|---|---|
| 393,381 | McSweeney | Nov. 27, 1888 |
| 410,293 | Rockwell | Sept. 3, 1889 |
| 493,883 | Ballet | Mar. 21, 1893 |
| 522,896 | Henley | July 10, 1894 |
| 1,251,901 | McCulloch | Jan. 1, 1918 |
| 2,047,976 | Lord | July 21, 1936 |
| 2,101,869 | Noble | Dec. 14, 1937 |
| 2,138,176 | Keys | Nov. 29, 1938 |
| 2,212,745 | McIntosh | Aug. 27, 1940 |
| 2,308,962 | Riesing | Jan. 19, 1943 |
| 2,354,538 | Parker | July 25, 1944 |
| 2,546,638 | Humason | Mar. 27, 1951 |
| 2,700,343 | Pezzillo | Jan. 25, 1955 |
| 2,716,566 | Thiry | Aug. 30, 1955 |
| 2,757,945 | Bingham | Aug. 7, 1956 |
| 2,867,453 | Watts et al. | Jan. 6, 1959 |

FOREIGN PATENTS

| | | |
|---|---|---|
| 764,238 | Great Britain | Dec. 19, 1956 |
| 501,139 | Belgium | Feb. 28, 1951 |
| 983,635 | France | Feb. 14, 1951 |
| 472,773 | Great Britain | Sept. 30, 1937 |